US007634436B1

(12) United States Patent
Wagner

(10) Patent No.: US 7,634,436 B1
(45) Date of Patent: Dec. 15, 2009

(54) SYSTEMS AND METHODS FOR SCHEDULING CONTRIBUTIONS TO A RETIREMENT SAVINGS PLAN

(76) Inventor: Gerald C. Wagner, 2101 Pacific Ave., No. 701, San Francisco, CA (US) 94115

( * ) Notice: Subject to any disclaimer, the term of this patent is extended or adjusted under 35 U.S.C. 154(b) by 1009 days.

(21) Appl. No.: 10/839,192

(22) Filed: May 5, 2004

Related U.S. Application Data

(60) Provisional application No. 60/467,776, filed on May 5, 2003.

(51) Int. Cl.
*G06F 17/60* (2006.01)
*G06F 17/00* (2006.01)
(52) U.S. Cl. .......................... 705/35; 705/36 R; 705/37
(58) Field of Classification Search ................... 705/35, 705/36, 37
See application file for complete search history.

(56) References Cited

U.S. PATENT DOCUMENTS

| 5,987,433 | A | * | 11/1999 | Crapo | 705/36 R |
|---|---|---|---|---|---|
| 6,064,986 | A | * | 5/2000 | Edelman | 705/36 R |
| 6,154,732 | A | * | 11/2000 | Tarbox | 705/36 R |
| 6,401,079 | B1 | * | 6/2002 | Kahn et al. | 705/30 |
| 2002/0091604 | A1 | * | 7/2002 | Loeper | 705/36 |
| 2002/0138386 | A1 | * | 9/2002 | Maggioncalda et al. | 705/36 |

OTHER PUBLICATIONS

Article: "Research on Participant Investment Behavior"; http://www.reish.com/practice_areas/EmpBenefits/benartzi.cfm in 22 pages as accessed on Jun. 3, 2004.

Article: ""One Step" Program to Simplify Retirement Decisions for 401(k) Participants"; Issued by The Vanguard Group, dated Thursday, Dec. 18, 2003 as accessed on Apr. 27, 2004 at http://www.benefitslink.com/pr/detail.php?id=37664 in 2 pages.
Wachovia Corporation & Instutional—AdviceTrack in 2 pages as accessed on Jun. 4, 2003 at http://www.wachovia.com/corp_inst/page/0,,7_18_198_711_4125,00.html.
Article: "Take a fresh look at your retirement investing" by Mary Beth Franklin, Kiplinger's; as accessed from http://moneycentral.msn.com/content/Retirementandwills/InvestYourSavings/P76541.asp?Printer on Jun. 10, 2004 in 7 pages.

(Continued)

*Primary Examiner*—Thomas A Dixon
*Assistant Examiner*—Hao Fu
(74) *Attorney, Agent, or Firm*—Knobbe Martens Olson & Bear LLP

(57) ABSTRACT

Computer-based systems and methods are described for generating personalized, automated contribution strategies for scheduling contributions to a retirement savings plan or other savings plan. Embodiments of the systems and methods provide visual and other educational displays to assist a client in choosing a suitable savings contribution strategy that may take into account at least one of the set consisting of: details of an employer-sponsored savings fund available to the client which may include opportunities for employer matching-funds, acceptable portion of standard-of-living increases derived from salary raises that the client is willing to contribute to a savings plan, client's current savings behavior and value of savings portfolio, effects of the stochastic nature of future investment portfolio value, and changing federal tax regulations. Clients may use the systems for educational and planning purposes and/or may authorize automated triggering of contributions with scheduled increases and/or decreases as specified by the selected plan.

11 Claims, 7 Drawing Sheets

OTHER PUBLICATIONS

Article: "IRS Releases Guidance on Default Elections"; The CPA Journal, Employee Benefit Plans, Feb. 2001; by Peter S. Altwardt, CPA, KPMG LLP; as accessed from http://www.nysscpa.org/cpajournal/2001/0200/dept/d027201b.htm on Jun. 10, 2004 in 3 pages.

Article: "Bosses encouraging 401(k) participation" by Elizabeth Harris; as accessed from http://www.contracostatimes.com/mld/cctimes/6775784.htm?lc on Jun. 10, 2004 in 4 pages.

Pension Research Council Working Paper "Lessons from Behavioral Finance for Retirement Plan Design" by Olivia Mitchell and Stephen Utkus; as accessed from http://papers.ssrn.com/sol3/Delivery.cfm/ssrn_ID464640_code031112670.pdf?abstractid=4640; in 54 pages.

* cited by examiner

FIG. 5

| Example Inputs | | |
|---|---|---|
| Current Age | 34 | |
| Gender | 1 | 1=female, 2=male |
| Health | 1 | 1=excellent, 2=average |
| Separation Age | 62 | Quit contributing to plan |
| Retirement Age | 62 | Begin withdrawals from plan |
| Current Gross Wages | 50,000 | |
| Expected Annual Raises | 5.0% | |
| Current Contribution Rate | 1.0% | |
| Company Match Percent | 50.0% | |
| Company Match Up To | 4.0% | (so 8% employee bogey) |
| Expected Annual Inflation | 3.0% | |
| Assumed Portfolio Return | 9.0% | |
| Current Portfolio Balance | 50,000 | |
| Real Annual Raise Contributed | 75% | Until Full Match Reached |
| Real Annual Raise Contributed | 25% | Thereafter |
| Assume Lifetime Annuity Return | 6.0% | hidden from user |
| Annual Annuity Escalation | 3.0% | match inflation |

| Example Results | 0% Plan | 25% Plan | 50% Plan | 75% Plan | 100% Plan | 125% Plan |
|---|---|---|---|---|---|---|
| Real Retirement Income | 40,116 | 47,894 | 52,485 | 55,005 | 56,894 | 59,731 |
| Real Last Year Salary | 84,038 | 84,038 | 84,038 | 84,038 | 84,038 | 84,038 |
| Salary Replacement | 48% | 57% | 62% | 65% | 68% | 71% |
| Real Last Taxable Income | 77,315 | 70,532 | 70,532 | 70,532 | 70,532 | 70,532 |
| Taxable Income Replacement | 52% | 68% | 74% | 78% | 81% | 85% |
| Next Year Std-of-Living Change | 0 | 0 | 0 | 0 | 0 | −0.5% |
| Avg Std-of-Living Increase | +1.7% | +1.3% | +1.3% | +1.3% | +1.3% | +1.3% |
| Year Limit is Reached | Never | 2029 | 2021 | 2018 | 2016 | 2013 |
| Year Full Match is Reached | 2007 | 2007 | 2007 | 2007 | 2007 | 2007 |
| First-year Contribution Rate | 2.9% | 2.9% | 2.9% | 2.9% | 2.9% | 3.4% |
| Last-year Contribution Rate | 8.0% | 16.1% | 16.1% | 16.1% | 16.1% | 16.1% |

|  | Annual Rates of Return | |
|---|---|---|
|  | Chance | Geometric Mean |
| Median 50-50 | 1 in 2 | 8.36% |
| 25th percentile | 1 in 4 | 6.88% |
| 10th percentile | 1 in 10 | 5.56% |
28 years Saving Horizon
9.0% Portfolio Return (stochastic)
Current plan is contributing 2.0% of nominal salary per year.
Proposed Plan is:
    Contributing 80% of real salary increases until full match is reached.
    Contributing 50% of real salary increases thereafter.
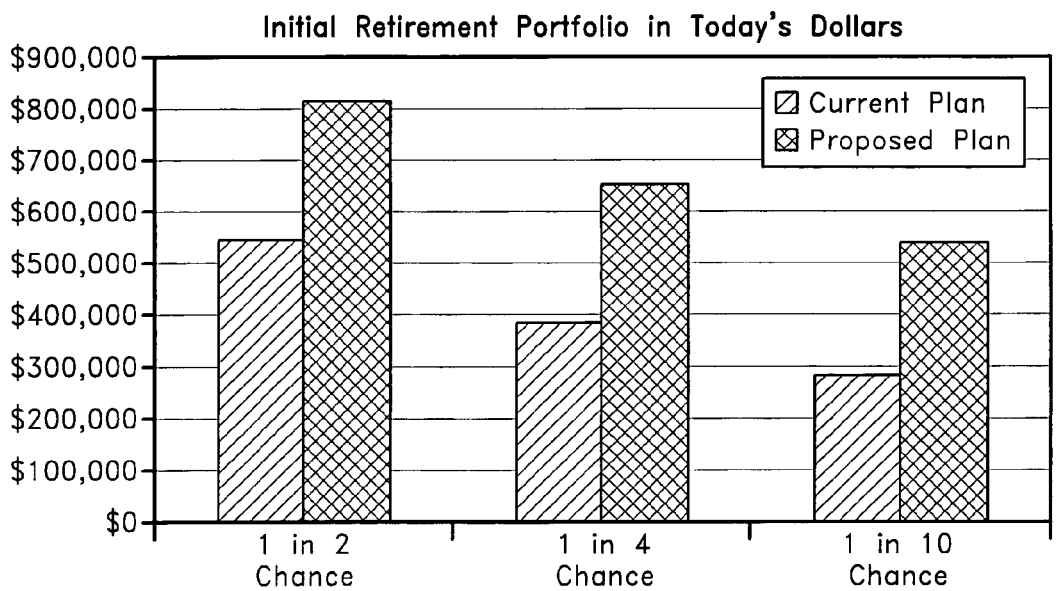
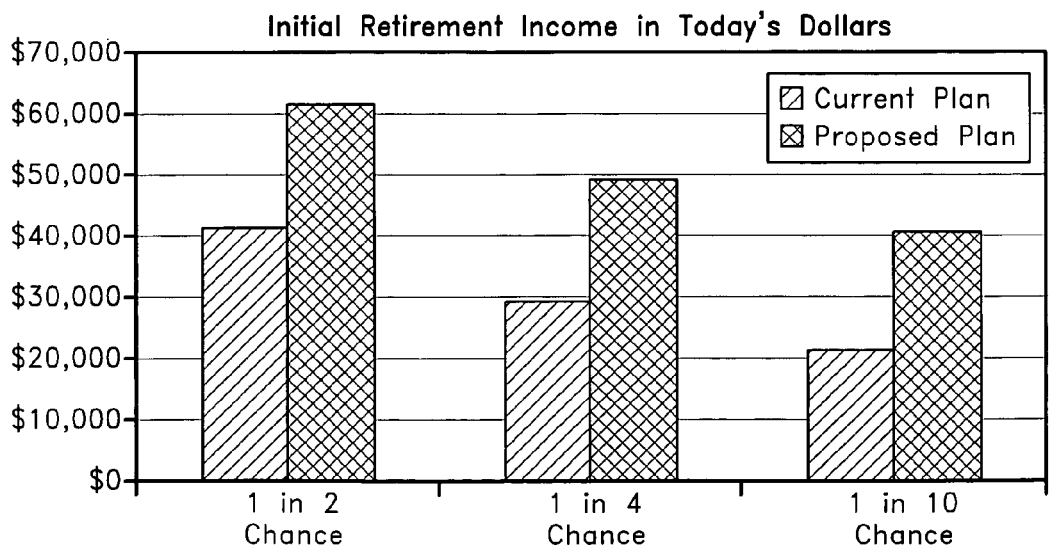
FIG. 7

SYSTEMS AND METHODS FOR SCHEDULING CONTRIBUTIONS TO A RETIREMENT SAVINGS PLAN

PRIORITY APPLICATION

This application claims priority benefit of U.S. Provisional Patent Application No. 60/467,776 filed May 5, 2003, and titled "SYSTEM AND METHOD FOR SCHEDULING CONTRIBUTIONS TO RETIREMENT SAVINGS PLANS," which is incorporated herein by reference in its entirety.

APPENDICES

This specification includes a partial source code listing of one aspect of a preferred embodiment of the invention, attached as Appendix A. These materials form a part of the disclosure of the specification. The copyright owner has no objection to the facsimile reproduction of this code listing and other code listings included in Tables 1-5 as part of this patent document, but reserves all other copyrights whatsoever.

FIELD OF THE INVENTION

The present invention relates generally to electronic financial analysis and advisory systems, and in particular, to systems for scheduling contributions to savings plans.

BACKGROUND OF THE INVENTION

As employer-sponsored defined benefit retirement plans become less commonly offered by employers, defined contribution plans, such as 401(k) and 403(b) plans that rely on employee contributions and employee investment choices are increasingly taking their place. With Social Security becoming a less certain source of retirement income, these defined contribution plans and other savings plans managed by the employee are becoming more important to the employee's eventual standard-of-living during retirement years.

Plan sponsors (employers) and plan providers (administrators) typically want to encourage increased savings. Towards this end, many employers offer to match a portion of an employee's savings, with certain limitations.

Individual savings are more important now than ever, but the many investment choices available to employees may be confusing to them. Many employees select a retirement savings contribution plan, possibly even one that does not take full advantage of employer matching finds, and continue with it, unchanged, for the duration of their employment. Many feel they need their full take-home salary right now and may not want to forego even the portion of their raises that goes beyond what's needed to maintain their current standard-of-living.

Financial planners, who are often best equipped to explain to employees the consequences of various contribution plan choices, are frequently paid based on client portfolio size. Since an average employee savings portfolio is relatively small (e.g., $15K), it is often not cost-effective for financial planners to provide individualized services to clients desiring advice regarding their retirement savings contributions.

SUMMARY OF THE INVENTION

Computer-based systems and methods are described that address the above-mentioned deficiencies by generating personalized, automated contribution strategies for scheduling contributions to a retirement savings plan or other savings plan. Embodiments of the systems and methods provide visual and other educational displays to assist a client in choosing a suitable savings contribution strategy that takes into account a plurality of factors, such as: details of an employer-sponsored savings fund available to the client which may include opportunities for employer matching-funds, acceptable portion of standard-of-living increases derived from salary raises that the client is willing to contribute to a savings plan, client's current savings behavior and value of savings portfolio, effects of the stochastic nature of future investment portfolio value, and changing federal tax regulations. Clients may use the systems for educational and planning purposes. Clients may authorize automated triggering of contributions with scheduled increases and/or decreases as specified by the selected plan.

The educational aspects of the systems and methods described herein help educate an employee regarding the significant long-term benefit contributing to retirement savings to the maximum limit matched by the employer and to receiving the maximum amount of free contributions from employer as soon as is possible. Furthermore, the systems and methods are configured to calculate and to show the employee that, as long as the employee receives raises that are above the current level of inflation, progress may be made towards the goal of full matching-funds eligibility without sacrificing the employee's current standard-of-living.

Once an employee authorizes contribution payments to be made according to a selected contribution schedule, the contribution schedule may be used by a contribution management application of the system to trigger automated contribution payments that increase and/or change according to the contribution schedule. Furthermore, the system may be configured to generate a two-staged contribution schedule that provides for a more accelerated rate of increasing contributions up until reaching the point of the employer's maximum matching-funds limit, and a less accelerated rate of increasing contributions after reaching the "full match" point.

An embodiment of a computer system is described for generating at least one proposed contribution schedule for a savings plan on behalf of a user and, upon receiving authorization from the user, for triggering automated changes in contributions to the savings plan, which is based at least in part on the authorized savings plan contribution schedule. The system comprises an input/output interface that is configured to receive input about a user desiring a savings plan contribution schedule. The input includes information that is selected from one or more of the following categories: the user's salary, the user's expected raises, the user's expected annual raise date, the user's expected retirement date, an available retirement savings plan, an available employer matching-funds program, the user's current savings contribution schedule, and the user's savings portfolio value. The system also comprises a calculation engine that is configured to receive the user input and to use the user input to generate a proposed savings contribution schedule for presentation to the user via the input/output interface. The input/output interface is further configured to receive an authorization from the user for the proposed savings contribution. The system further comprises a repository of client records that is configured to record the authorization in association with the user and the savings contribution schedule and a contribution management application that is configured to receive information about the authorized savings contribution schedule and to trigger automatic changes to contributions to a savings plan in accordance with the authorized savings contribution schedule.

An embodiment of the system is described wherein the calculation engine is further configured to access a portfolio expected arithmetic return value that predicts expected performance of a savings portfolio belonging to the user. The calculation engine is further configured to use the portfolio expected arithmetic return value to calculate one or more confidence intervals of possible retirement savings portfolio outcomes related to the portfolio's percentile probabilities for presentation to the user.

An embodiment of the system is described, wherein the calculation engine is further configured to convert a possible savings portfolio value into a value expressing projected portfolio income by generating an annuity factor that considers one or more of the following categories of information: the user's current age, savings horizon, gender, state of health, improvements in mortality rates over the savings horizon, annuity return, survivor payouts, if any, and annual income escalation, if any.

An embodiment of a computer system is described for generating at least one proposed contribution schedule for a retirement savings plan on behalf of a client. Upon receiving authorization from the client, the computer system may trigger automated, increasing contribution payments to the retirement savings plan, based at least in part on the authorized retirement savings plan contribution schedule generated by the system. The computer system may comprise an input interface, an output interface for transmitting information to the client, a repository of reference data, at least one calculation engine, a repository of client records, and a contribution management application. The input interface may be configured to receive input from a client desiring a retirement savings plan contribution schedule, comprising information about the client's salary and expected raises, an expected retirement date, an available employer-sponsored retirement savings plan, an available employer matching-funds program, the client's current savings contribution schedule, and savings portfolio value. The input interface may be further configured to receive additional information from the client. The repository of reference data may store data useful for generating a retirement saving plan contribution schedule, comprising government-issued conditions and limitations upon the employer-sponsored savings plan. The calculation engine(s) may be configured to receive the client input and the additional information from the input interface and to access the reference data from the repository. The calculation engine may be further configured to use the client input and the reference data to generate at least one proposed retirement savings contribution schedule and to transmit the at least one proposed retirement savings contribution schedule to the output interface for transmission to the client. The input interface may be further configured to receive an authorization from the client regarding one proposed retirement savings contribution schedule and to transmit information about the authorization. The repository of client records may be configured to receive the information about the authorization and to store a client record comprising information about the client and about the authorized retirement savings contribution schedule, and the contribution management application may be configured to receive information about the authorized retirement savings contribution schedule and to trigger automatically increasing contribution payments to a retirement savings plan in accordance with the authorized retirement savings contribution schedule.

Embodiments are also described in which a savings contribution strategy is generated that allows a client to designate time periods in the savings horizon during which the client chooses to decrease and/or to halt savings plan contributions.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages taught or suggested herein. Accordingly, neither this summary nor the following detailed description purports to define the invention. The invention is defined only by the claims.

BRIEF DESCRIPTION OF THE DRAWINGS

These and other features will now be described with reference to the drawings summarized below. These drawings and the associated description are provided to illustrate preferred embodiments of the invention, and not to limit the scope of the invention.

Throughout the drawings, reference numbers are re-used to indicate correspondence between referenced elements. In addition, the first digit of each reference number indicates the figure in which the element first appears.

FIG. 5 depicts one example of inputs and a table of results generated by the contribution management system.

FIG. 7 depicts two examples of visualization charts portraying stochastic calculations that may be generated by the contribution management system based on a client's inputs.

DETAILED DESCRIPTION OF THE PREFERRED EMBODIMENT

Figure 1:
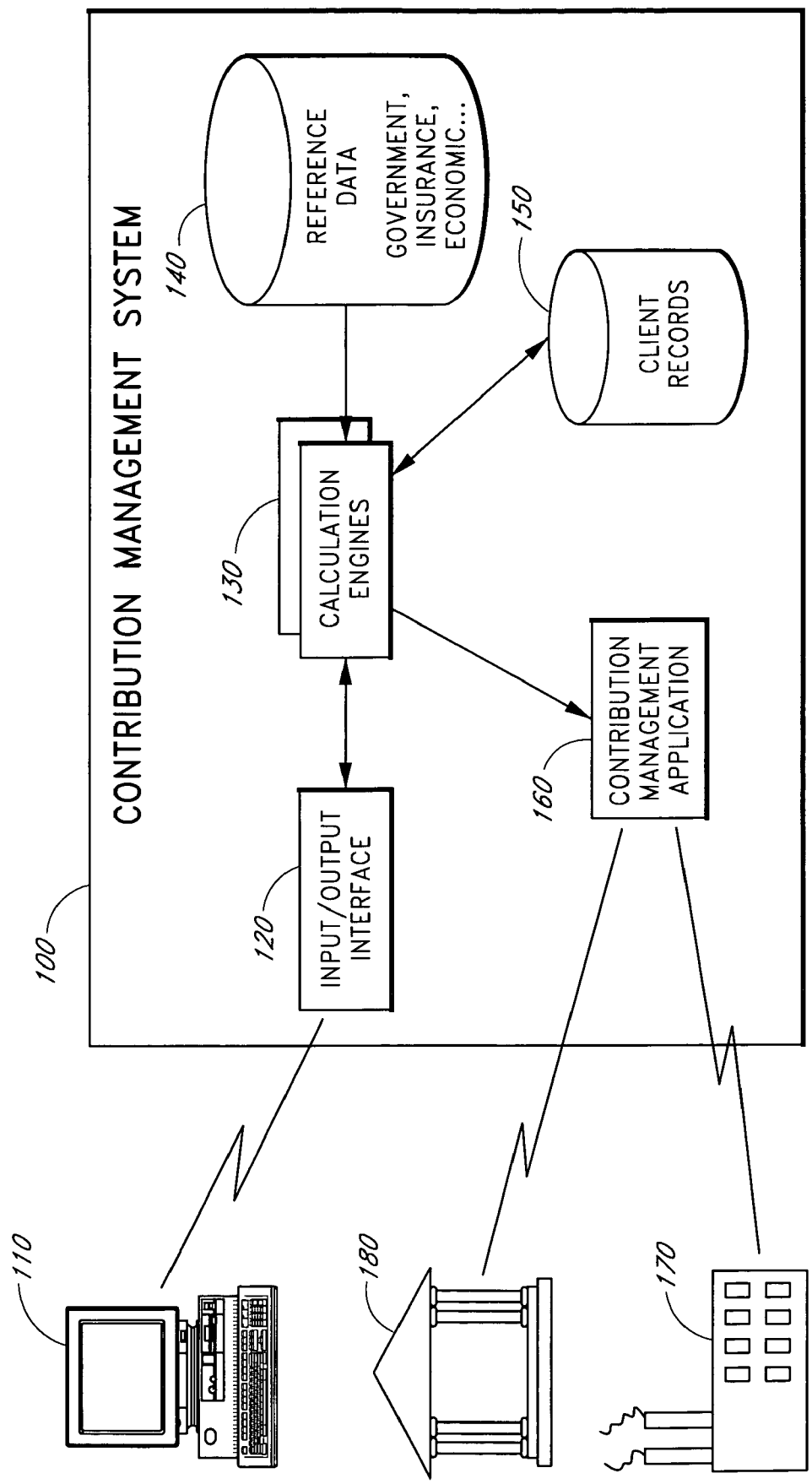
FIG. 1 is a block diagram depicting one embodiment of a contribution management system.

The present invention provides automated systems and methods for calculating and generating personalized schedules for contributing to a savings plan, such as to a 401(k) program, other employer-sponsored retirement savings plan, and other non-retirement savings plans.

In one embodiment, the system is configured to accept as inputs information about a client's current salary, current savings behavior, expected raises, and additional personal information relevant to a determination of probable need for funds during retirement. The system also accepts as inputs details about a retirement savings plan sponsored by the employer and other relevant information available from governmental, insurance agency, and financial institutions, in order to calculate the outcomes of a variety of savings strategies available to the client. The calculations may then be used to provide data for creating displays for educational and visualization purposes as well as to administer retirement fund payment contributions for the client based on a strategy selected and authorized by the client.

In one embodiment, the system may be configured to determine whether the client is taking full advantage of the employer's matching program. Graphic visualization displays provided by the system may be used to educate the client regarding the benefits of taking advantage of the employer's full match as early as is feasible.

The system may be further configured to assess the probable effect of inflation on a client's expected annual raises and retirement portfolio value. Regarding raises, the difference between the nominal raise, that is, the raise in today's dollars as it is listed on paper and offered by the employer, and the inflation rate may be called the client's "real raise" or "real salary increase," since that is the portion of the nominal raise that is available for increasing the client's standard-of-living as measured by buying power. A client may choose to contribute the "real salary increase" portion of an annual raise received and still be able to enjoy the same buying power as in the previous year. Alternatively, a client may choose to contribute a portion of the "real salary increase" to retirement savings and still be able to enjoy an increase in standard-of-living, albeit a smaller increase than if the entire annual raise had been kept and not saved.

Combining the influences of inflation and "real raises," the system may accept information from the client regarding whether the client is willing to forego any portion of the expected upcoming "real raises" in order to reach full employer match more quickly. Combined calculation/visual/financial capabilities in the system allow the system to generate personalized savings strategies for the client and to present expected outcomes of the strategies to the client using a variety of formats, such as graphical, tabular, and text-based. If desired by the client/employee, the system may create a personalized two-stage savings strategy that calls for more aggressive saving (that is, foregoing more of the client's "real raises") up until the point at which full employer match is attained, and for less aggressive saving from that point forward.

In some embodiments, the system has access to information that takes into account the stochastic nature of most savings portfolios, which is to say, the element of chance that the portfolio will perform as predicted. The system may be configured to provide the client with visual, graphical, and/or text-based information that incorporates the stochastic information for enhanced decision-making capabilities. Other multi-staged savings strategies may be created using embodiments of the systems and methods described herein, including strategies that allow a client to designate one or more time periods during which contributions to a savings plan will be decreased and/or stopped altogether.

Throughout the text, the term "client" is to be understood to mean an employee, contributor, or other user who desires assistance in creating an advantageous savings scheduling strategy, and does not of itself imply any particular business relationship or payment agreement. Thus, a client, for purposes of this application, is someone who makes use of the systems and methods described herein, either directly or via an intermediary, for purposes that may be educational and/or may implement or trigger ongoing, automated direction of in the client's savings contributions.

Furthermore, it may be useful to clarify the notion of the client's "savings horizon," which, basically, is the time until the client's retirement, or in other words, the time during which the client may contribute earned dollars towards retirement savings.

Preferred embodiments of the automated contribution systems and methods will now be described with reference to FIGS. 1-7. Throughout the description, embodiments of the systems and methods that are directed to contributions made to an employer-sponsored retirement savings plan are described. These details are provided in order to illustrate preferred embodiments of the invention, and not to limit the scope of the invention. The systems and methods may be applied to various savings plans that may or may not be sponsored by an employer. The scope of the invention is set forth in the appended claims.

FIG. 1 is a block diagram depicting one embodiment of a contribution management system 100. As depicted in FIG. 1, the contribution management system 100 may be accessed by a client or by another party acting on behalf of the client from a client computer 110 that is in communication with the contribution management system 100 using a computer network such as the Internet or an Intranet. A client may use the client computer 110 to transmit to the contribution management system 100 information about the client's current retirement plan situation and preferences. The contribution management system 100 uses the client information, along with other information to generate one or more retirement savings contribution schedules for presentation to and for approval by the client or another party working on behalf of the client. The client may further receive from the contribution management system 100 via the client computer 110 requests for additional information, as well as data regarding the outcomes of various retirement plan contribution schedules available to the client.

The data from the contribution management system 100 may be presented by the client computer 110 to the client in any of a variety of formats, including as charts, graphs, tables, or formatted text. In other embodiments, the data may be presented to the client as one or more a text-based or graphics-based data files, as an email, a fax, a hyperlink, an HTML-based Web page or other online, or other form of communication using an audio and/or video format.

The client computer 110 may be implemented to communicate with the contribution management system 100 using a variety of systems and protocols. In one embodiment, the contribution management system 100 is implemented as a stand-alone program that may be stored within and used on a desktop computer that may also serve as the client computer 110, thus eliminating a need for remote communications between the two.

The contribution management system 100 may be further configured to communicate, via Internet, intranet, or other computer-based, using wired or wireless communications media, with a plan sponsor 170, such as an employer that sponsors a 401(k) or other retirement savings plan for its employees. The contribution management system 100 may additionally or alternatively be configured to communicate with a plan provider 180, such as a retirement plan administrator or a wealth management system that provides a broader range of financial services to individuals and other entities. In particular, the contribution management system 100 may obtain from the plan sponsor 170 and/or the plan provider 180 details about one or more retirement savings plans offered by the plan sponsor 170 that may be used by the contribution management system 100 for generating proposed contribution schedules for the client. The contribution management plan 100 may also communicate with the plan sponsor 170 and/or the plan provider 180 when the client elects to use a proposed contribution plan and authorizes the contribution management system 100 to participate in triggering associated contribution payments.

In some embodiments, the contribution management system 100 may operate as part of the plan provider 180 or wealth management system, such that communications between the contribution management system 100 and the plan provider 180 may take place via internal communications systems. In some embodiments, the contribution management system 100 may be configured as an application that is accessible to a benefits administrator of a large employer/plan sponsor who uses the contribution management system 100 to educate and motivate clients as to the value of contributing towards retirement savings, and, in particular, if applicable, to attaining "full employer match."

The embodiment of the contribution management system 100 depicted in FIG. 1 includes an input/output interface 120, a calculation engine 130, a repository of reference data 140, a repository of client records 150, and a contribution management application. The components 120, 130, 140, 150 may be implemented using physical servers. The input/output interface 120 may, for example, be a Web-based application that runs on a physical server of a web site system.

The input/output interface 120 receives the user input from the client and communicates the user input to the calculation engine 130 used for generating a variety of retirement plan contribution-related data, as will be described in greater detail throughout the remainder of the specification. The calculation engine 130 may be implemented as one or more software or hardware modules or components for carrying out the functions of the calculation engine 130 as described throughout the specification. For ease of description, the calculation engine 130 will be referred to in the singular throughout the text. The input/output interface 120 may further transmit the data generated by the calculation engine 130 to the client to provide the client with information that is viewable and usable in a variety of formats, such as, in the form of charts, graphs, tables, spreadsheets, and text documents that may help the client to understand long- and short-term consequences associated with various contribution-related decisions.

The calculation engine 130 is further configured to obtain information from a repository of reference data 140 that may include, but is not limited to, government data, insurance industry data, and financial industry data. Government data may include any of a wide variety of information useful to the calculation engine 130, most particularly information about federal or other governmental regulations and limitations regarding contributions to retirement savings plans. Insurance industry data may include actuarial information for men and women, married and single, of various ages and states of health that may be used by the calculation engine 130 to determine a retirement horizon or expected lifespan during which the client will be spending accumulated retirement savings. Financial industry data may include information on expected patterns of inflation and investment returns from various savings vehicles that may be used by the calculation engine to predict the future value of contributions to retirement savings plans. These and/or other types of reference information may be used by the calculation engine in order to present information to the client that clearly describes the expected outcomes of various contribution-related decisions and may be used to create a retirement contribution schedule to suit the client's personal situation.

As is well known in the art of computer storage technology, the repository 140 may be configured according to any of a wide variety of methodologies, using any of a variety of hardware and software products, and employing any of a variety of data structures, data retrieval methods, and the like. Thus, it will be understood that the repository 140 may be configured as a set of smaller repositories of reference data, or even that the repository 140 may, for example, reside externally to the contribution management system 100 and may be accessed by the contribution management system 100 using a form of remote communications system.

The client may elect to make retirement contributions based on a contribution schedule presented by the contribution management system 100. In a preferred embodiment, the calculation engine 130 may transmit information about the selected contribution schedule and about the client's retirement plan to a contribution management application 160 that is configured to trigger payments on behalf of the client based on the elected contribution schedule.

As further depicted in FIG. 1, the calculation engine 130 may communicate with a repository of client records 150. For clients who have previously input personal and employer information into the contribution management system 100, and who may wish to update their current retirement contribution plan, the client records repository 130 may store a record of the inputted data that may be used as a basis for calculating a new plan. Furthermore, the client record repository 150 may be used to store arrays and other results of calculations generated by the calculation engine 130 for use in creating informational displays and what-if scenarios that may help the client understand the implications of various savings contribution payment scheduling strategies. In some embodiments, arrays and other calculated values that pertain to a contribution scheduling strategy other than one selected and authorized by the client may be deleted from the client records database 150 once a scheduling strategy has been selected.

As further depicted in FIG. 1, the calculation engine 130 may communicate with the contribution management application in order to trigger communications with the employer or other plan sponsor 170 and/or with the plan provider or administrator 180. In particular, if the client elects to make contributions to a savings plan based on a contribution schedule proposed by the contribution management system 100, the client may also authorize the contribution management system 100 to initiate payment of the contributions or to communicate information about the elected schedule to other entities for initiating payments and scheduled changes to payments amounts as specified by the schedule.

Figure 2:
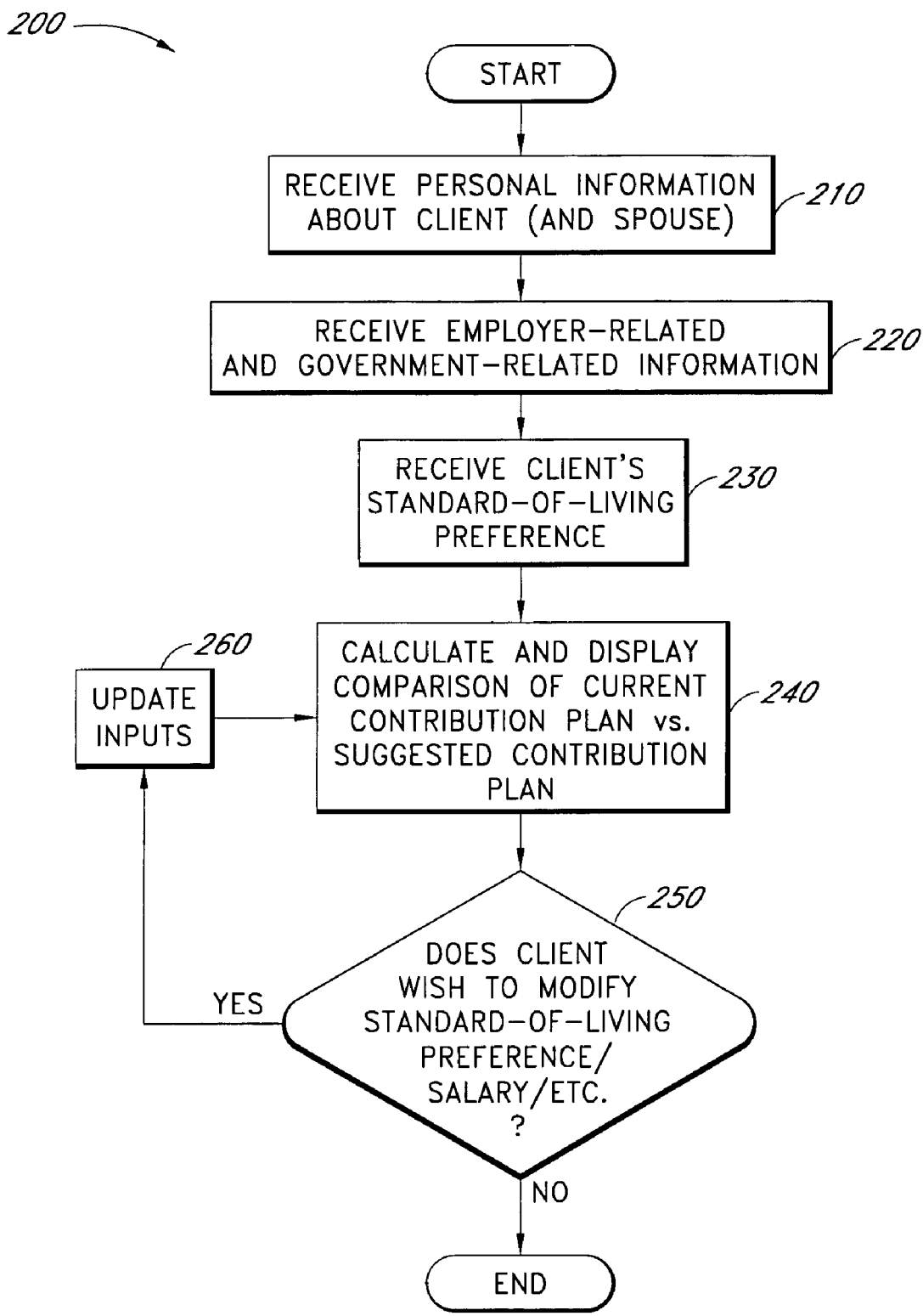
FIG. 2 is a flowchart depicting one embodiment of a method for calculating and displaying the results of various contribution plans based on standard of living increases from raises.

FIG. 2 is a flowchart that depicts one embodiment of a process 200 for calculating and displaying to the client the results of various hypothetical contribution schedules, based, at least in part, on expected standard-of-living (SOL) increases derived from the client's raises in salary.

In Block 210, the calculation engine 130 receives personal information about the client, and, in some embodiments, about the client's spouse. The calculation engine may receive the information from the input/output interface 120 and/or from records of information about the client that are stored in the client records repository 150. The information about the client may comprise information about the client's salary, expected annual raises, expected number of years before retirement, current savings contribution schedule, current savings portfolio amount, assumed average return on the portfolio, and current state of health.

In Block 220, the calculation engine 130 receives information about the client's employer in its capacity as retirement savings plan sponsor 170, namely, whether it matches employee contributions to the retirement plan and, if so, with what restrictions and limitations. For example, does the company fully match the employee's contributions, or does it match a portion of the contributions, such as matching 50% of the employee's contributions? Are there minimum and/or maximum limits placed on how much the employer is willing to match within a given year, and are the limits expressed as percentage rates or dollar amounts? Is there any other employer-related information available that is useful for generating one or more proposed contribution plans?

In Block 220, the calculation engine 130 further receives government-related information that pertains to retirement savings plans and related issues, such as maximum limits for how much a client may contribute to a retirement savings plan within a given year and, if usable by the calculation engine 130, information about tax rates and regulations.

In Block 230, the calculation engine 130 receives information from the client regarding a level of standard-of-living (SOL) increase that the client is willing to accept while dedicating a portion of future raises to retirement fund contributions. In some embodiments, the client's standard-of-living preference may be expressed as two percentages, to reflect a two-staged preference: one to define contribution rate increases before the point where the employer's matching limit is reached, and one to define contribution rate change after the employer's matching limit is reached. For example, in FIG. 5, in the table entitled "Example Inputs," the boxed and bolded lines show that the client has elected to contribute 75% of real annual salary rises to the retirement find up until the point at which full employer match level is reached, and to drop the rate of contribution increase thereafter down to 25%.

In Block 240, the calculation engine 130 performs calculations to generate one or more proposed contribution schedules for presentation to the client. The calculation engine 130 may generate a contribution schedule that represents the client's current contribution activity. The calculations make use of the information received in Blocks 210, 220, and 230, as well as on information from the reference repository 140. The calculations will be described in detail with reference to FIG. 4.

Still in Block 240, the contribution management system 100 may use the generated schedules and associated data to present to the client depictions of the proposed schedules, and, in some embodiments, to present comparisons with the client's current contribution plan.

In Block 250, the contribution management system 100 presents the client an opportunity to modify some or all of the input data and thus to create what-if scenarios that may provide the client with educational assistance for decision-making. For example, the client may wish to be presented information about the effects of dedicating a different percent of real annual raises towards retirement savings. If the client so chooses, the client may update inputs in Block 260, and the process 200 returns to Block 240. Otherwise, if the client does not wish to view the effects of additional changes to the inputs, the process 200 ends.

Figure 3:
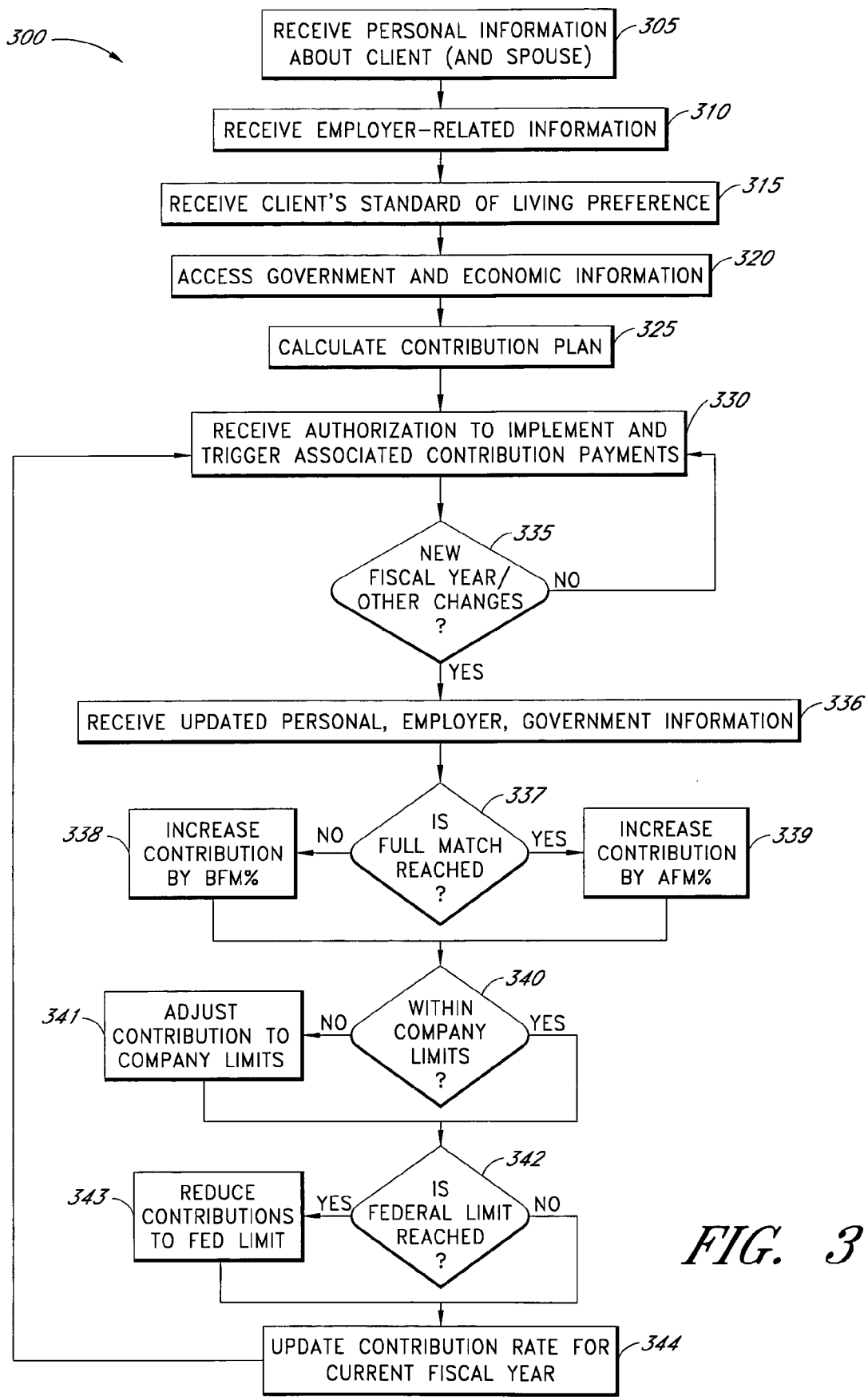
FIG. 3 is a flowchart depicting one embodiment of a method for calculating and updating a contribution plan and for triggering contribution payments based on the plan.

FIG. 3 is a flowchart that depicts one embodiment of a process 300 for calculating and updating a contribution plan and for triggering contribution payments based on the plan. Blocks 305, 310, 315, 320 and 325 represent the obtaining of data about the client, about the employer's retirement savings plan, about the client's standard-of-living preferences, and about relevant governmental and economic information. However, in Block 330, the client selects a proposed contribution schedule and authorizes the contribution management system 100 to trigger the associated contribution payments to the client's retirement savings plan.

In Block 335, the contribution management system 335 determines if a new fiscal year has begun since the most recent contribution payment, or if the system 100 has received new input from the client. If no changes or new input has occurred, the process 300 cycles back to Block and waits to trigger the next scheduled contribution payment.

Blocks 336-344 depict a portion of the process 300 that updates the proposed contribution plan. If a change has occurred, the process moves on to Block 336, where the calculation engine 130 receives the updated information. In Block 337, the calculation engine 130 determines whether the employer's full match level has been reached by the client's contribution plan. If full match level has not been reached, at Block 338 the process 300 increases the current contribution payment amount by a Before Full Match (BFM %) amount generated by the calculations engine. If full match level has been reached, at Block 339 the process 300 increases the current contribution payment amount by an After Full Match (AFM %) amount generated by the calculations engine.

In Block 340, the calculation engine 130 determines whether the newly calculated contribution payment amount is within the contribution limits set by the employer. If yes, the process 300 moves on to Block 342. If not, in Block 341, the payment amount is adjusted to comply with company limits before moving on to Block 342.

In Block 342, the calculation engine 130 determines whether the newly adjusted contribution payment amount is below the maximum contribution limit set by the federal government. If yes, the process 300 moves on to Block 344. If not, in Block 343, the payment amount is reduced to comply with company limits before moving on to Block 344.

Once the updates and adjustments have been made and stored in the client record repository 150, the process 300 returns to Block 330, where the contribution management system 100 continues to trigger contribution payments on behalf of the client and to check whether it is time for an update.

Figure 4:
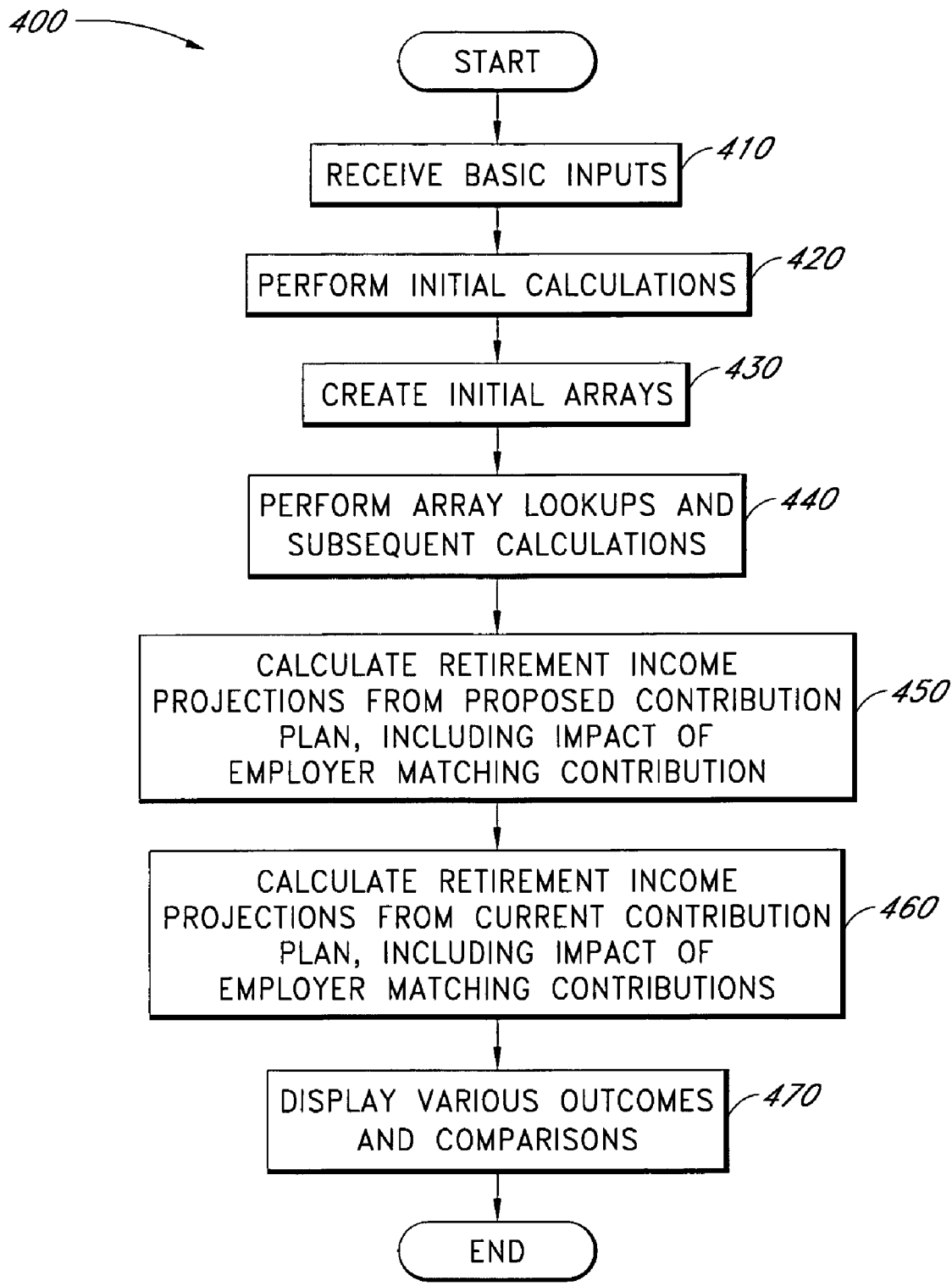
FIG. 4 is a flowchart depicting one embodiment of a method for calculating values and arrays that may be used for creating contribution plans for visualization/educational purposes and/or for triggering contribution payments based on a plan.

FIG. 4 is a flowchart that depicts one embodiment of a process 400 for calculating values and arrays used by the contribution management system 100 to create contribution schedules for visualization and educational purposes and/or for triggering contribution payments based on a selected contribution schedule. The process 400 comprises calculations that allow for the presentation of information in a variety of graphs, charts, and other easily-understandable formats to the client regarding, for example, proposed amounts and schedules of savings plan contributions per year, comparisons with alternate contribution schedule plans, as well as the effects of each in terms of portfolio value across the client's savings horizon. The process 400 is described with reference to the flowchart of FIG. 4 and with reference to TABLES 1-5, which present sample calculations for one embodiment of the process 400 that are written using computer code syntax compatible with Microsoft Excel spreadsheet applications. It is to be understood, however, that the systems and methods described herein are not limited to embodiments that are encoded in a given computer language or executed with a given computer application. Rather, embodiments of the systems and methods may be implemented using computer code written in Java, C++, or any of a variety of other computer languages, and may be configured to run on a variety of computer platforms. As described above, the contribution management system 100 may be implemented as a stand-alone system, as part of more comprehensive wealth management system, as or an adjunct to computer applications already used by a financial planner, a retirement plan administrator, an employee benefits coordinator, or other party interested in educating clients about savings plans and/or in administering client payments to the plans.

Returning now to FIG. 4, the process 400 begins at Block 410 when the calculation engine 130 receives basic inputs from one or more of: the input/output interface 120, the client records repository 150, and the reference data repository 140. Data received from these sources is assigned to variables used by the calculation engine 130, as exemplified by the Excel-based code in TABLE 1. Here, basic information about the client is encoded, such as age, gender, health status, expected retirement age, current salary, expected annual raises, and a current value of the client's savings portfolio.

Additional inputs available from government, insurance, and other sources regarding Internal Revenue Service (IRS) regulations, the Consumer Price Index, mortality tables, and the like are encoded for use in the calculations.

In addition, in the embodiment associated with the inputs listed in TABLE 1, the client may choose whether future increases in savings contributions will be based on a constant percentage of salary or based on an acceptable level of standard-of-living increases associated with future raises. In TABLE 1 and in the tables to follow, the model based on standard-of-living increases is named the "Lifestyle" model. Furthermore, for either model, the client has the option of selecting two contribution increase rates: one for the period of time before the client's contribution rate meets or exceeds the employer's full match limit (BFM—before full match), and one for after the full match limit has been reached (AFM—after full match). Thus, the illustrated embodiment allows for a two-stage contribution schedule, or, if the AFM and BFM values are the same, for a one-stage contribution schedule.

TABLE 1

Basic Inputs currentAge = MIN(70,MAX(17,Age_Now_Input))
retireAge = MIN(100,MAX(Retire_Age_Input,currentAge+1))
gender = IF(gender_Input = 1,1,2)
health = IF(health_Input = 1,1,2)
currentSalary = MAX(Wages_Now_Input,5000)
salaryIncrease = MIN(0.25,MAX(0,Annual_Raises_Input / 100))
currentContrib = MIN(0.4,MAX(0,Current_Contribution_Rate_Input / 100))
matchPercent = MIN(1,MAX(0,Company_Match_Percent_Input / 100))
matchLimit = MIN(1.0,MAX(0,Company_Match_Up_To_Input / 100))
employeeContributionMax = MIN(1.0,MAX(0,Company_Employee_Max_Limit_Input / 100))
employeeContributionMin = MIN(1.0,MAX(0,Company_Employee_Max_Limit_Input / 100))
cpiEstimate = MIN(salaryIncrease-0.0000001,MAX(0,Annual_Inflation_Input / 100))
portfolioReturn = MIN(0.12,MAX(0.04,Portfolio_Return_Input / 100))
portfolioBalance = MAX(0,Portfolio_Balance_Input)
lifestyleOrConstantMethod = 1
constantPercentBFM = MIN(0.5,MAX(0,ConstantPercentEntryBFM / 100))
constantPercentAFM = MIN(0.5,MAX(0,ConstantPercentEntryAFM / 100))
percentRealAdded = MIN(25,MAX(0,Percent_of_Raise_Input / 100))
percentRealAddedAFM =
    MIN(25,MAX(0,Percent_of_Raise_Input_After_Full_Match / 100))
lifeExpectancy = 25.60

In various other embodiments of the contribution management system 100, the client may be offered a variety of additional and/or alternative options for the creation of personalized savings contribution strategies. For example, the client may be offered the option of specifying fixed increases, also known as step-ups, in the contribution rate, which may be defined in terms of dollar amounts or percentages, such as a fixed increase in percentage of the client's salary. The client may be offered the option to define increases as a portion of raises received. In the embodiment shown in TABLE 1, the client has the option of basing contribution increases on real raises, which has been defined above as the nominal raise minus the effects of inflation. The client may be offered the option of specifying contribution increases as a percentage of nominal raises. Furthermore, the client may be offered the option of designating one or more time periods during the client's saving horizon during which time the client prefers to limit, stop, or otherwise specify contributions or a method of calculating contributions.

In Block 420 of FIG. 4, the calculation engine 130 performs initial calculations, using the basic input described, as exemplified by the Excel-based code in TABLE 2. In the embodiment shown in TABLE 2, the calculation engine 130 calculates a full match contribution rate, which is a contribution level expressed as a percentage of salary that maximizes the employer's matching contribution. The full match contribution rate may be seen as a contribution level goal for the client to reach. Some contribution schedules generated by the contribution management system 100 may use the point at which the client reaches the full match contribution rate as a turning point for a two-staged "lifestyle" model in which the client contributes at a higher rate before reaching full match (BFM) in order to more quickly attain the benefits of full employer matching contributions. For example, the client may choose to forego standard-of-living increases available from annual raises, and may instead choose to contribute the portion of the annual raise that goes beyond maintaining a current standard of living. Some clients using a two-staged "lifestyle" model may prefer to lower the acceleration rate of their savings contributions after full match has been attained (AFM) and may at that point choose to retain a greater portion of their salary increases for immediate spending availability.

TABLE 2

Initial Calculations firstFullMatchYearContrib = matchLimit / matchPercent
savingHorizon = retireAge-currentAge
realSalaryIncrease = ((1+salaryIncrease) / (1+cpiEstimate)−1)
realTaxableGrowth = (1−percentRealAdded)*realSalaryIncrease
realTaxableGrowthAFM = (1−percentRealAddedAFM)*realSalaryIncrease
realSalaryFactor = realSalaryIncrease / (1+realSalaryIncrease)
firstContribIncrease = percentRealAdded*(1−currentContrib)*realSalaryFactor
annualContribIncrease = (1−currentContrib − firstContribIncrease) * realSalaryFactor *
    percentRealAdded / firstContribIncrease
firstContribIncreaseAFM = percentRealAddedAFM * (1−currentContrib) * realSalaryFactor
annualContribIncreaseAFM = (1−currentContrib−firstContribIncreaseAFM)
    *realSalaryFactor*percentRealAddedAFM / firstContribIncreaseAFM TABLE 2 further presents equations for calculating a portion of future salary raises that goes beyond the inflation rate as measured by the Consumer Price Index and that represents a "real salary increase" which may be used to increase the client's current standard-of-living, if not contributed to savings. Other calculations, such as those listed for realTaxableGrowth and realTaxableGrowthAM allow the calculation engine 130 to factor in the effect of taxes in generating contribution schedules. Other embodiments may use the nominal raise as offered by the employer without considering the effects of inflation and/or may not consider the tax implications on the value of current and future dollars.

In Block 430 of FIG. 4 the calculation engine 130 creates an initial set of arrays based on the basic inputs and the initial calculations of Blocks 410 and 420 above. APPENDIX A, at the end of this specification, presents one embodiment of a set of array definitions written in code for a Microsoft Excel application. In the example presented in APPENDIX A, the length the defined arrays is equal to the savings horizon of the client in years. Thus, if the client expects to have twenty-five years before retirement, and thus twenty-five years more to save, the arrays created will be twenty five elements long to express the expected changes over the client's saving horizon, such as changes in client salary, contribution rate, value of the dollar, value of savings portfolio, federal and other limits on contributions, and the like. As one example, by looking up the client's age in ageArray[i] for a given year, the calculation engine 130 may determine whether the client is fifty years old or more and is thus permitted by IRS regulation to contribute an additional "catch-up" amount of pre-tax dollars to a 401(k) savings plan.

The arrays defined in APPENDIX A provide for a two-staged savings contribution schedule allowing different rates of contribution increase before and after the client reaches the point of full matching-funds from the employer. The arrays further incorporate input from the client regarding a percentage of future real raises that the client is willing to dedicate to savings, allowing the generated contribution savings plan to be personalized to suit the client's situation and preferences.

In Block 440 of the process 400, the calculation engine 130 performs array lookups and subsequent calculations that allow the contribution management system 100 to generate visual, textual, and other displays to demonstrate the effects of a proposed schedule of savings contributions. TABLE 3 presents one embodiment of array lookups and associated calculations, expressed as Excel-based code, which may be used to generate a proposed savings contribution schedule for the client. The embodiment depicted in TABLE 3 calculates a year when the client will be eligible for full matching funds from the employer and a number of years until full match is reached. Furthermore, the calculation engine 130 makes use the array values to lookup information about the future value of the client's portfolio and salary, including the effect of inflation on both.

TABLE 3

Array Lookups

```
yearFullMatchProposed =
    IF(ISNUMBER(MATCH(matchLimit,employerProposedMatchPercentArray,0)),LOOKUP
    (MATCH(matchLimit,employerProposedMatchPercentArray,0)- 1, arrayElementNum,
    calendarYearArray),"Never")
yearsUntilFullMatchProposed =
    LOOKUP(yearFullMatchProposed,calendarYearArray,arrayElementNum)
medianPortfolioValue = LOOKUP(savingHorizon-1,arrayElementNum,medianPortfolioEndValue)
medianPortfolioValueEmployer = LOOKUP(savingHorizon-1,
    arrayElementNum,medianEmployerPortfolioBalanceArray)
currentPlanMedianPortfolioValue = LOOKUP(savingHorizon-1,
    arrayElementNum,currentPlanMedianPortfolioBalanceArray)
currentPlanMedianPortfolioValueEmployer = LOOKUP(savingHorizon-1,
    arrayElementNum,currentPlanMedianEmployerPortfolioBalanceArray)
lastYearDeflator = LOOKUP(savingHorizon-1,arrayElementNum,cpiDeflatorArray
lastYearSalary = LOOKUP(savingHorizon-1,arrayElementNum,futureSalaryArray)
lastYearSalaryDeflated = LOOKUP(savingHorizon-1, arrayElementNum,deflatedSalaryArray)
lastYearTaxable = LOOKUP(savingHorizon-1,arrayElementNum,futureTaxableArray)
lastYearTaxableDeflated = lastYearTaxable*lastYearDeflator
```

In Block 450 of FIG. 4, the calculation engine 130 calculates an expected retirement income for the client, assuming that the client elects to authorize contribution payments based on the proposed contribution schedule. TABLE 4 presents Excel code for one embodiment of the retirement income calculations that include calculations for determining the portion of the retirement income that is due to employer contributions.

TABLE 4

Retirement Income - Proposed Plan

```
annuityAnnualPayment = medianPortfolioValue / annuityPV1000Factor
annuityAnnualPaymentDeflated = annuityAnnualPayment*lastYearDeflator
incomeReplacementRatio = annuityAnnualPayment / lastYearSalary
taxableReplacementRatio = annuityAnnualPayment / lastYearTaxable
annuityAnnualPaymentEmployer = medianPortfolioValueEmployer / annuityPV1000Factor
annuityAnnualPaymentDeflatedEmployer = annuityAnnualPaymentEmployer*lastYearDeflator
annuityAnnualPaymentFromMatchPercent = annuityAnnualPaymentDeflatedEmployer /
    annuityAnnualPaymentDeflated
```

TABLE 4-continued

Retirement Income - Proposed Plan nextYearSOLincrease = LOOKUP(1,arrayElementNum,actualRealGrowthArray)
avgSOLincrease = EXP(AVERAGE(logRealIncreaseArray))−1
yearsBeforeLimits = savingHorizon−
COUNT(IF(proposedEmployeeDollarsContribArray>irsDollarLimitArray,
    arrayElementNum))
yearLimitsReached = IF(yearsBeforeLimits =
    savingHorizon,"Never",LOOKUP(yearsBeforeLimits,arrayElementNum,calendarYearArray))
yearFullMatchAchieved =
IF(ISNUMBER(MATCH(matchLimit,employerMatchPercentArray,0)),LOOKUP(MATCH
    (matchLimit,employerMatchPercentArray,0)−1,arrayElementNum,calendarYearArray),"Never")

In Block 460 of the process 400, the calculation engine 130 calculates the value of the client's retirement income, including portion deriving from employer contributions, if any, that is based on the client's current saving contributions. TABLE 5 presents an example of Excel-based code for one embodiment of this portion of the process 400.

In Block 470 of the process 400, the contribution management system 100 uses the calculations of the process 400 to create one or more displays for presentation to the client that may illustrate aspects of various possible contribution savings schedules and may illustrate comparisons between them and the client's current savings contributions, thus helping the client to understand the implications of various savings schedules.

TABLE 5

Retirement Income - Current Plan currentPlanAnnuityAnnualPayment = currentPlanMedianPortfolioValue /
    annuityPV1000Factor
currentPlanAnnuityAnnualPaymentDeflated = currentPlanAnnuityAnnualPayment*lastYearDeflator
currentPlanIncomeReplacementRatio = currentPlanAnnuityAnnualPayment / lastYearSalary
currentPlanTaxableReplacementRatio = currentPlanAnnuityAnnualPayment / (lastYearSalary*(1−
currentContrib))
currentPlanAnnuityAnnualPaymentEmployer = currentPlanMedianPortfolioValueEmployer /
annuityPV1000Factor
currentPlanAnnuityAnnualPaymentDeflatedEmployer =
currentPlanAnnuityAnnualPaymentEmployer*
    lastYearDeflator
currentPlanAnnuityAnnualPaymentFromMatchPercent =
currentPlanAnnuityAnnualPaymentDeflatedEmployer /
    currentPlanAnnuityAnnualPaymentDeflated
currentPlanLastYearTaxableDeflated = lastYearSalary*(1−currentContrib)*lastYearDeflator
currentPlanNextYearSOLincrease =
LOOKUP(1,arrayElementNum,currentPlanActualRealGrowthArray)
currentPlanAvgSOLincrease = EXP(AVERAGE(currentPlanLogRealIncreaseArray))−1
currentPlanYearsBeforeLimits = savingHorizon−
COUNT(IF(currentPlanProposedEmployeeContribArray>(currentPlanEmployeeContribArray +
    0.00001),arrayElementNum))
currentPlanYearLimitsReached = IF(currentPlanYearsBeforeLimits =
    savingHorizon,"Never",LOOKUP(currentPlanYearsBeforeLimits,arrayElementNum,
    calendarYearArray))
currentPlanFullMatchYesNo = IF(matchPercent*currentContrib> = matchLimit,1,2)

FIG. 5 depicts one example of inputs and a table of results generated by the contribution management system. As depicted in FIG. 5, clients may enter information regarding personal information and information about their employer-sponsored savings plan, and the calculation engine 130 is able to display information about a variety of contribution plans that it has generated, which the client may examine and may choose to authorize.

Figure 6A:
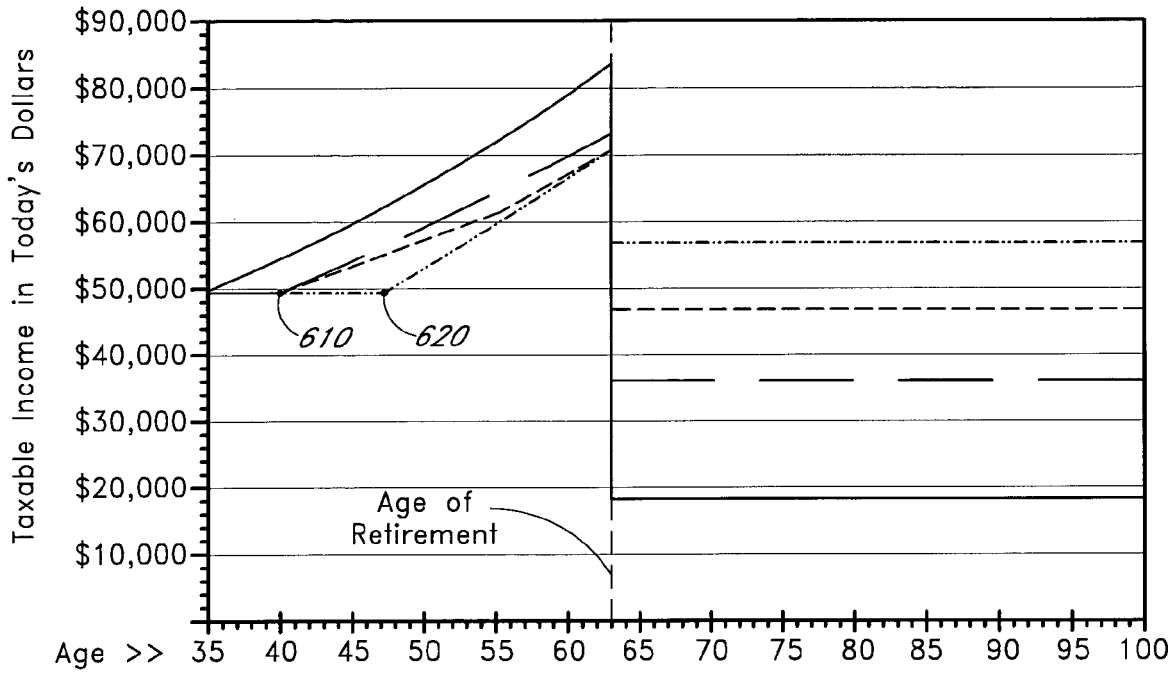
FIG. 6A depicts a first example of a visualization chart that may be generated by the contribution management system based on a client's inputs.
Figure 6B:
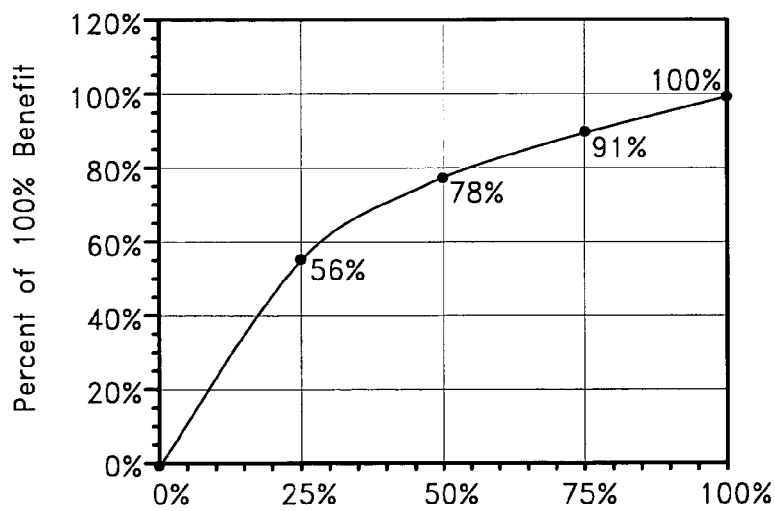
FIG. 6B depicts a second example of a visualization chart that may be generated by the contribution management system based on a client's inputs.

FIGS. 6A and 6B depict two examples of visualization graphs that may be generated by the contribution management system 100 based on the client's inputs and the calculations performed by the calculation engine 130. The graphs may be displayed to the client to help illustrate the consequences saving for retirement according to various contribution schedules. For example, the chart in FIG. 6A illustrates four strategies for managing the client's annual income for each year until age one hundred. The chart illustrates the fact that while contributing nothing towards savings may allow for a higher level of income during the client's pre-retirement years than does contributing any portion of the client's salary, it also results in a lower annual income in the years following retirement. Implementing a two-staged contribution schedule in which 100% of future raises, except for what is needed to maintain the client's current standard-of-living, is saved up until the full employer match point is reached at approximately age forty-seven, and keeping 100% of raises thereafter, results in a post-retirement annual income that is approximately $22,000 higher than that if the client chooses to save no money. At the same time, the pre-retirement income is only slightly lower. One of ordinary skill in the art of financial planning and analysis will be familiar with additional ways in which the data calculated by the calculation engine may be used to produce graphic displays useful for educating clients about the advantages and disadvantages of various contribution schedules, including choosing not to contribute at all.

For example, the chart of FIG. 6B, also calculated using the client inputs and other input data, illustrates that contributing even a small amount towards savings provides a great advantage. For example, contributing 50% of Real Annual Raises gives 73% of the benefit of contributing 100% of Real Raises.

FIG. 7 depicts two examples of bar charts that visually portray stochastic calculations which may be generated based on a client's inputs by some embodiments of the contribution management system 100. Stochastic calculations take into account the fact that the monies in a savings portfolio are typically invested in one or more financial vehicles with the intent of earning a profit on the return, and are thus also subject to an element of chance that the investment may not achieve its expected return. Thus, the stochastic calculations provide a greater degree of sophistication and precision than do calculations that rely on an average estimated level of performance to accurately predict future portfolio performance. The two bar charts of FIG. 7 present the client's expected initial retirement portfolio at various percentile markers in terms of full dollar value and in terms of annual income generated, based on both the client's current contribution plan and on a proposed savings plan. Thus, the charts visually present to the client a more realistic view of the advantages of the proposed savings plan across variety of outcomes of varying probabilities, and may encourage the user to dedicate a greater portion of current earnings towards retirement savings in order to increase the chances of a desired future outcome.

The bar charts of FIG. 7 each illustrate three possible portfolio outcomes based on the client's current savings contribution plan, which, as depicted in the example of FIG. 7, is contributing 2% of the client's salary per year, and three possible portfolio outcomes based on the proposed savings contribution plan, which is contributing 80% of real salary increases until full employer match is reached, and contributing 50% of real salary increases thereafter.

The three possible portfolio outcomes for each plan correspond to three different percentiles. The median is the fiftieth percentile, with fifty percent chance that the outcome will be above the result shown and a fifty percent chance that it will be less. The contribution management system 100 may be configured to calculate and display to the client two additional worse outcomes, so as not to give the client a false sense of confidence in their retirement projections. For rapid calculations in these and other what-if scenarios, the contribution management system 100 may calculate the outcomes using formulas described below rather than with the use of Monte Carlo simulation, which may call for thousands of simulations to be run and then sorted. The results of the two methods are similar and the client's experience may be enhanced by an attendant reduction in wait time for results to be displayed.

The contribution management system 100 may allow the client to set the percentiles of the displayed outcomes as a client input or may use percentile levels that pre-determined. For example, as shown in the FIG. 7 example, the median 50-50 outcome of the proposed plan may be $811,343, but the twenty-fifth percentile may be only $647,390. This indicates that there is a one-in-four chance that the outcome could be $647,390 or less. The tenth percentile could be $535,474. This indicates that there is a one-in-ten chance that the outcome could be $535,474 or less.

The contribution management system 100 may calculate a variety of percentile levels, both higher and lower, for presentation to the client. For example, given the inputs of the example in FIG. 7, the ninetieth percentile level may be $2,000,000, indicating that there is a nine-in-ten chance that the actual portfolio value upon retirement may be $2,000,000 or less, while at the same time indicating that there is a one-in-ten chance that the actual portfolio value upon retirement could be $2,000,000 or higher.

To avoid confusion by showing too many numbers, or numbers that are high with only a remote chance of being attained, a preferred embodiment of the contribution management system presents three percentiles—median, lower, and lower yet—that may provide the client with a useful tool for understanding retirement planning choices.

Given the client's expected annual arithmetic portfolio return as an input, the calculation engine 130 may calculate a range of possible outcomes. The expected annual arithmetic portfolio return may be a numeric value input to the system 100 as a client input or may be derived from a model portfolio of investments that the user has chosen. In one embodiment, the calculation engine 130 generates two arrays of numbers, each two hundred elements long. The two arrays represent risk and return points along an efficient frontier generated using Modern Portfolio Theory. A first array comprises portfolio returns ranging from a most conservative (money markets) to a most aggressive (small-cap growth equities). A second array comprises annual normal standard deviations that are pair-wise associated with the portfolio returns array.

Given an expected arithmetic return, the calculation engine 130 may perform array lookups that generate an associated annual normal standard deviation. As described above, a Savings Horizon is a numerical expression of a number of years that the client expects to continue contributing to the selected savings plan. Risk diminishes over time, and a horizon standard deviation is calculated by multiplying the annual standard deviation times the square root of the Savings Horizon. If the array lookup standard deviation is 10.82% and the Savings Horizon is 28 years, the adjusted portfolio standard deviation at the Savings Horizon is 57.25%. (The square root of 28 is 5.29, and multiplying by 10.82% gives 57.25%)

The calculation engine 130 may convert the expected arithmetic return into a geometric mean using its associated annual normal standard deviation. A median value of a log-normal distribution is its geometric mean. The geometric mean is then converted into a normal mean by taking the logarithm of one plus the geometric mean. The normal mean is then multiplied by the Savings Horizon to find a portfolio relative value. For example: If the arithmetic return is 9.00%, then the geometric mean is 8.36%, and the normal mean is 8.03%, and the portfolio mean relative horizon value is 224.91%.

The calculation engine 130 may use normal function probability formulas to find Z values given the percentiles chosen. Z values are how many standard deviations a result varies from the expected mean. For example, the single-tail Z value for the tenth percentile is 1.282—only one-in-ten times will the result be 1.282 or more standard deviations below the mean.

The outcome for the example portfolio of FIG. 7 is 224.91% (its mean relative horizon value) less 1.282 times 57.25% (its horizon standard deviation) resulting in a terminal normal relative return equal to 151.53%. Dividing this by 28 (the Savings Horizon) gives an annual normal return of 5.41%. The annual normal return is then converted to an annual geometric return by taking its anti-log and subtracting one, i.e., 5.56%.

The result in this example is that there is a one-in-ten chance (the tenth percentile) that this 9.00% expected return portfolio will have an annual geometric return of 5.56% or lower. The calculation engine 130 may then use this 5.56% return to calculate the worst one-in-ten dollar outcome for the savings plan. With iterations, the calculation engine 130 may determine returns and dollar outcomes for a number of risk levels (percentiles) as the user desires. The 5.56% shows in the third column of the Annual Rates of Return Table from FIG. 7.

As a benefit of this feature, if the client desires to risk only a 25% chance of missing his/her retirement income goals (the twenty-fifth percentile), the client may decide to instruct the contribution management system 100 to increase contribution increases more rapidly to the point where the twenty-fifth percentile outcome meets the retirement outcome goals.

Clients may find that a chart depicting initial retirement income as opposed to initial portfolio value may help them to understand more clearly how much they will need to save for their desired level of retirement wealth. The calculation engine 130 may be configured to use an annuity present value factor unique to each user using actuarial formulas, as described below, for converting retirement portfolio dollars to retirement income dollars. In a preferred embodiment, the formulas are applied using mortality rate tables as published by The Society of Actuaries, which are computed using millions of actual life results, making the formulas more accurate and certainly faster than Monte Carlo simulation.

The annuity factor may be divided into the portfolio balance upon retirement to estimate the client's income in the first year of retirement. Provisions are made for escalating retirement income, for example, by 3.0% per year, to offset the effects of inflation. Clients may be shown streams of retirement income in both nominal (future) and real (today's) dollars. Real dollars are informative because people are used to thinking in terms of today's prices.

In one embodiment, the calculation engine 130 obtains inputs regarding the client's current age, gender, state of health, and whether the portfolio will have single or joint beneficiaries. If the client has a spouse or partner, the current age, gender, and state of health of the spouse or partner is also input to the calculation engine 130. If a single beneficiary is indicated, any spouse or partner entries may be ignored. Additional input used for calculating annuity present value factor according to the embodiment include: a deferred start year (generally the saving horizon, zero would be an immediate annuity); if joint, a survivor's payout ratio; an annuity's discount rate; an annuity's annual escalation rate (growth in annual income), and an annuity's term certain period (zero years means that there is no certain period and that annuity income stops when no beneficiary is living).

In one embodiment, the state of health and gender entries determine which of four mortality tables to apply. Average health may indicate use of the U.S. Census Decenniel 2000 Tables for males or females (general population). Excellent health may indicate use of the U.S. Individual Annuitant Mortality 2000 Tables for males or females (annuitants).

A deferred start year is used with schedules of improvements in future mortality as published by the Society of Actuaries. As people take better care of themselves and health care improves, future mortality rates may fall. For example, a person 35 years old today who expects to retire at age 60, may have lower annual mortality rates when they reach 60 in 25 years than the annual mortality rates of someone who is 60 now.

The current age(s) input plus the deferred start year gives the age(s) at annuitization, which is the process of converting portfolio balances to annual or monthly income. These "start spending" age(s) combined with appropriate mortality tables (adjusted for future improvements in mortality) may used to generate annual survivorship chances to a point where the younger beneficiary turns 121 years old (the tables stop at age 120). If there are two beneficiaries, two survivorship numbers are needed for each year—the chance that both are alive and the chance that only one is alive. The second number is needed to calculate figures if the sole survivor's benefit is less than 100% of the annuity payout when both annuitants are alive. For example, an annuity may pay $2,000 each month when both beneficiaries are alive and then fall by one-third to $1,333 each month if only one annuitant is alive.

Given the annuity's discount rate and annual escalation rate (if any), the calculation engine 130 calculates a present expected value (the annuity factor) of payouts reflecting chances of survivorship. TABLE 6 below shows results for 34-year-olds who expect to retire at age 62. An annuity factor of 13.12 from the table below is used to generate the charts of FIG. 7.

| Parameters | A<br>Single<br>Fixed | B<br>Single<br>Escalating | C<br>Joint<br>2/3 to<br>Survivor | D<br>Joint<br>100% to<br>Survivor | E<br>Joint<br>Escalating |
|---|---|---|---|---|---|
| Survivor Payout | N/A | N/A | 66.67% | 100.00% | 100.00% |
| Annuity Discount Rate | 6.00% | 6.00% | 6.00% | 6.00% | 6.00% |
| Income Growth Rate | 0.00% | 3.00% | 0.00% | 0.00% | 3.00% |
| Annuity Factor | 13.12 | 17.97 | 13.24 | 14.33 | 20.18 |
| $250,000 would give: | | | | | |
| Annual Income | $19,056 | $13,910 | $18,877 | $17,441 | $12,386 |
| Monthly Income | $1,640 | $1,197 | $1,625 | $1,501 | $1,066 |

Note that escalating payments materially impact an initial income level. See columns A and B in TABLE 6. In column B, retirement income is calculated as growing by 3.0% each year. With no Income Growth Rate (column A), annuitants receive more income initially, but inflation may erode their purchasing power each year.

In the TABLE 6 above, column C shows a case where benefits will fall by one-third if either beneficiary dies. The contribution management systems and methods also provide for annuity factors where a primary beneficiary continues to receive 100% of joint benefits after the spouse/partner dies, but if the primary beneficiary dies, the spouse/partner will receive reduced income if that option was selected.

The contribution management systems and methods also provide for annuity factors that include a term certain period. A term certain is a guarantee that income will continue for a given number of years even if all annuitants die before the certain period has expired. These factors are important for clients who do not want to risk outliving the actuarial estimates of their lives. Displays based on calculations of the calculation engine 130 may show clients at what point there is only a 25% chance that one of the partners is alive, or any other percentage chance of survival. A 50% chance of survival is "life expectancy," as frequently used in financial planning application, but 50% of clients will, by definition, outlive their life expectancy. If a client sees that there is a 25% chance that they or their spouse/partner will be alive at age 92, when retiring at age 62, they may choose to be cautious and enter a 30-year term certain. At the end of the term certain, the calculation engine 130 may continue with its calculations, adding to the annuity factor using the chance that someone is living until the youngest annuitant would be 121 years old.

Although this invention has been described in terms of certain preferred embodiments, other embodiments that are apparent to those of ordinary skill in the art are also within the scope of this invention. Accordingly, the scope of the present invention is intended to be defined only by reference to the appended claims.

In the claims, which follow, reference characters used to denote process steps are provided for convenience of description only, and not to imply a particular order for performing the steps.

APPENDIX A

Initial Array Definitions

The length of each array is the savings horizon (how many more years of participation)
i(the arrayElementNum) ranges from 0 to (savingHorizon−1)
calendarYearArray[i]=currentYear+i
cpiDeflatorArray[i]=1/((1+cpiEstimate)^i)
ageArray[i]=currentAge+i
futureSalaryArray[i]=(1+salaryIncrease)*futureSalaryArray[i−1]
deflatedSalaryArray[i]=cpiDeflatorArray[i]*futureSalaryArray[i]
proposedContribIncreaseBFMArray[i]=proposedContribIncreaseBFMArray[i]*annualContribIncrease
proposedEmployeePercentContribArray[i]=proposedEmployeePercentContribArray[i−1]+proposedContribIncreaseBFMArray[i]
employerProposedMatchPercentArray[i]=MIN (matchLimit,
matchPercent*proposedEmployeePercentContribArray[i])
proposedEmployeePercentContribVsFullMatchArray[i]= proposedEmployeePercentContribArray[i]−firstFullMatchYearContrib
proposedTaxableIncomeBFMArray[i]=IF (i>yearsUntilFullMatchProposed, proposed TaxableIncomeBFMArray[i−1]*(1+realTaxableGrowthAFM), deflatedSalaryArray[i]*(1−IF (i=yearsUntilFullMatchProposed, proposedEmployeePercentContribArray[i]−proposed EmployeePercentContribVsFullMatchArray[i], proposedEmployeePercentContribArray[i]))
proposedDollarContribBFMAFMArray[i]=deflatedSalaryArray[i]−proposedTaxableIncomeBFMArray[i]
proposedPercentContribBFMAFMArray[i]=proposedDollarContribBFMAFMArray[i]/deflatedSalaryArray[i]
proposedContribIncreaseAFMArray[i]=IF(lifestyleOrConstantMethod'=1, IF(AND(percent RealAdded< >percentRealAddedAFM, B[i]'=(yearsUntilFullMatchProposed+1)), (proposedPercentContribBFMAFMArray[i]−proposedPercentContribBFMAFMArray[i−1]), proposedContribIncreaseAFMArray[i−1]*annualContribIncreaseAFM), constantPercentAFM)
proposedEmployeePercentContribAFMArray[i]=proposedEmployeePercentContribAFMArray[i−1]+IF (i=yearsUntilFullMatchProposed, MAX(proposedEmployeePercentContribArray[i]−proposedEmployeePercentContribVsFullMatchArray[i]−proposedEmployeePercent ContribAFMArray[i−1], proposedContribIncreaseAFMArray[i]), IF(i>yearsUntilFullMatch Proposed, proposedContribIncreaseAFMArray[i], proposedContribIncreaseBFMArray[i]))
proposedEmployeeDollarsContribArray[i]=futureSalaryArray [i]*proposedEmployeePercentContribAFMArray[i]
irsDollarLimitArray[i]=LOOKUP(currentYear+i, limitYearArray, contribLimitArray)
actualEmployeeFutureDollarContribArray[i]=MIN(proposedEmployeeDollarsContribArray[i], irsDollarLimitArray[i])
actualPercentEmployeeContribArray[i]=MIN(employeeContributionMax,MAX(employee ContributionMin,actualEmployeeFutureDollarContribArray[i]/futureSalaryArray[i]))
actualDollarEmployeeContribArray[i]=actualPercentEmployeeContribArray[i]*futureSalaryArray[i]
actualFutureEmployeeContribIncreaseArray[I]=actualDollarEmployeeContribArray [i]/actualDollarEmployeeContribArray[i−1]−1
actualEmployeeTodaysDollarContribArray[i]=actualDollarEmployeeContribArray [i]*cpiDeflatorArray[i]
actualEmployeeTodaysPercentContribArray[i]=actualEmployeeFutureDollarContribArray[i]/futureSalaryArray[i]
employeeContribPercentOfLimitArray[i]=actualEmployeeFutureDollarContribArray[i]/irsDollarLimitArray[i]
employerMatchPercentArray[i]=MIN(matchLimit, matchPercent*actualEmployeeTodaysPercentContribArray[i])
employerMatchDollarsArray[i]=employerMatchPercentArray[i]*futureSalaryArray[i]
futureTaxableArray[i]=futureSalaryArray[i]−actualEmployeeFutureDollarContribArray[i]
taxableIncomeTodaysDollarsArray[i]=futureTaxableArray [i]*cpiDeflatorArray[i]
actualRealGrowthArray[i]=taxableIncomeTodaysDollarsArray[i]/taxableIncomeTodaysDollarsArray[i−1]−1
futureDollarRaiseVsSalaryIncreaseArray[i]=((futureTaxableArray[i]/futureTaxableArray[i−1])−1)/salaryIncrease
realDollarRaiseVsRealSalaryIncreaseArray[i] actualRealGrowthArray[i]/realSalaryIncrease
logRealIncreaseArray[i]=log(1+actualRealGrowthArray[i])
medianPortfolioEndValue[i]=(1+portfolioReturn)*(medianPortfolioEndValue[i−1]+actualEmployeeFutureDollarContribArray[i]/2+employerMatchDollarsArray[i]/2)+ actualEmployeeFutureDollarContribArray[i]/2+ employerMatchDollars Array[i]/2
currentPlanProposedEmployeeContribArray[i]=futureSalaryArray[i]*currentContrib
currentPlanEmployeeContribArray[i]=MIN(S[i], currentPlanProposedEmployeeContribArray[i])
currentPlanEmployerContribArray[i]=MIN(matchLimit, currentContrib*matchPercent)*futureSalaryArray[i]
currentPlanTaxableIncomeTodaysDollarsArray[i]=(futureSalaryArray[i]−currentPlanEmployeeContribArray[i]) *cpiDeflatorArray[i]
currentPlanActualRealGrowthArray[i]=currentPlanTaxableIncomeTodaysDollarsArray[i]/currentPlanTaxableIncomeTodaysDollarsArray[i−1]−1
currentPlanLogRealIncreaseArray[i]=log(1+currentPlanActualRealGrowthArray[i])
currentPlanMedianPortfolioBalanceArray[i]=(1+portfolioReturn)*(currentPlanMedianPortfolio BalanceArray[i−1]+currentPlanEmployeeContribArray[i]/2+currentPlanEmployer ContribArray[i]/2)+ currentPlanEmployeeContribArray[i]/2+ currentPlanEmployer ContribArray[i]/2
currentPlanMedianEmployerPortfolioBalanceArray[i]=(1+ portfolioReturn)*(currentPlanMedian EmployerPortfolioBalanceArray[i−1]+currentPlanEmployerContribArray[i]/2)+currentPlan EmployerContribArray[i]/2 medianEmployerPortfolioBalanceArray[i]=(1+portfolioReturn)*(medianEmployerPortfolio BalanceArray[i−1]+employerMatchDollarsArray[i]/2)+employerMatchDollarsArray[i]/2

What is claimed is:

1. A computer system configured to generate at least one proposed retirement savings plan contribution schedule for a retirement savings plan on behalf of a user and, upon receiving authorization from the user, to trigger automated increasing contribution payments to the retirement savings plan on behalf of the user, based at least in part on the authorized retirement savings plan contribution schedule, the system comprising:

at least one repository of data about a retirement savings contribution matching program available to the user, wherein the data includes an indication of a limit to contribution matching available to the user;

an input/output interface configured to receive input from a user desiring a retirement savings plan contribution schedule, the input comprising information about the user's salary, the user's expected rate of salary raise, a first desired standard-of-living increase for a first period of time until the user's savings plan contribution reaches the limit to the contribution matching available to the user, a second desired standard-of-living increase for a second period of time after the user's savings plan contribution reaches the limit to the contribution matching available to the user, and the input/output interface further configured to present information to the user;

at least one look-up module configured to access reference data for generating a retirement savings plan contribution schedule, the reference data comprising economic information indicative of an expected rate of inflation;

a calculation engine configured to receive the user's expected raise information and the expected inflation rate information and to calculate an expected real raise amount for the user and to use the expected real raise amount and the information about the user's first and second desired standard-of-living increases to generate a retirement savings plan contribution schedule to maintain the first desired standard-of-living increase for the first period of time and to maintain the second desired standard-of-living increase for the second period of time for presentation to the user via the input/output interface, the input/output interface further configured to receive an authorization from the user for the proposed retirement savings plan contribution schedule;

a repository of client records configured to record the authorization in association with the user and the retirement savings contribution schedule, the repository comprising at least one computer hardware device; and a contribution management application configured to receive information about the authorized retirement savings plan contribution schedule and to trigger automatically increasing contribution payments to a retirement savings plan in accordance with the authorized retirement savings plan contribution schedule.

2. The computer system of claim 1, wherein the calculation engine is further configured to calculate the expected real raise amount, based, at least in part, on a difference between the user's expected rate of salary raise and the expected rate of inflation.

3. The computer system of claim 2, wherein the input/output interface is further configured to receive the user's first and second desired standard-of-living increases as amounts comprising all or a portion of the expected real raise amount.

4. The computer system of claim 3, wherein the calculation engine is further configured, in response to receiving information indicating that either the user's first desired standard-of-living increase, or the second desired standard-of-living increase, or both, equals zero, to generate at least one retirement saving plan contribution schedule in which the user's contribution increase is equal to the expected real raise amount.

5. The computer system of claim 1, wherein the look-up module is configured to access the reference data at least in part from at least one data repository maintained within the computer system.

6. The computer system of claim 1, wherein the look-up module is configured to access the reference data at least in part from the Internet.

7. The computer system of claim 1, wherein the look-up module is configured to access the reference data at least in part from the user via the input/output interface.

8. A computer-implemented method for generating at least one proposed schedule for contributions to a retirement plan, comprising:

storing in at least one repository, data about a retirement savings contribution matching program available to a user seeking a retirement savings plan contribution schedule, wherein the data includes an indication of a limit to contribution matching available to the user;

receiving data for the user, the data including at least the following: information about the user's salary and expected nominal raises, a first preferred standard-of-living increase for a first period of time until the user's savings plan contribution reaches the limit to the contribution matching available to the user, a second preferred standard-of-living increase for a second period of time after the user's savings plan contribution reaches the limit to the contribution matching available to the user, and an expected future rate of inflation;

calculating, by a calculation engine, the user's expected real raises as the difference between the nominal raises and the expected future rate of inflation;

identifying a portion of the user's expected real raises that is available for increasing the user's contributions to the retirement savings plan, wherein the portion is calculated as the difference between the user's expected real raises and the user's preferred level of standard-of-living increase;

programmatically generating at least one proposed retirement savings contribution schedule that is based at least in-part on the received data, such that the user's contributions increase based at least in part on the identified portion of the user's expected real raises; and outputting the proposed retirement savings contribution schedule for presentation to the user via a computer user interface that provides an option for the user to authorize the proposed retirement savings contribution schedule;

recording, by a repository of client records, the user's authorization of the proposed retirement savings contribution schedule; and automatically triggering increasing contribution payments to a retirement savings plan in accordance with the authorized retirement savings plan contribution schedule.

9. The computer-implemented method of claim 8, further comprising:

receiving information about the user's current retirement savings contribution schedule; and displaying a comparison of the user's current retirement savings contribution schedule and at least one proposed retirement savings contribution schedule.

10. The computer-implemented method of claim 8, further comprising receiving changes to the data for the user and using the changed data to generate at least one additional proposed retirement savings contribution schedule for presentation to the user.

11. The computer-implemented method of claim 8, wherein:

receiving data about the available employer-sponsored retirement savings plan further comprises receiving data about an employer matching-funds program, including a limit on the employer's matching-funds contributions; and generating at least one proposed retirement savings contribution schedule further comprises generating a schedule that includes a time period during which the user's retirement savings plan contributions increase to equal the limit on the employer's matching funds.

* * * * *

UNITED STATES PATENT AND TRADEMARK OFFICE
CERTIFICATE OF CORRECTION

PATENT NO.       : 7,634,436 B1                                          Page 1 of 1
APPLICATION NO. : 10/839192
DATED            : December 15, 2009
INVENTOR(S)      : Gerald C. Wagner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1624 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,634,436 B1 | Page 1 of 1 |
| APPLICATION NO. | : 10/839192 | |
| DATED | : December 15, 2009 | |
| INVENTOR(S) | : Gerald C. Wagner | |

It is certified that error appears in the above-identified patent and that said Letters Patent is hereby corrected as shown below:

At column 1, line 49, change "finds," to --funds,--.

At column 9, line 10, change "find" to --fund--.

At column 20, line 15, below "FIG. 7." insert --TABLE 6--.

At column 24, line 23, in claim 8, change "storing" to --storing,--.

Signed and Sealed this
Twenty-second Day of March, 2011

David J. Kappos
*Director of the United States Patent and Trademark Office*